UNITED STATES PATENT OFFICE.

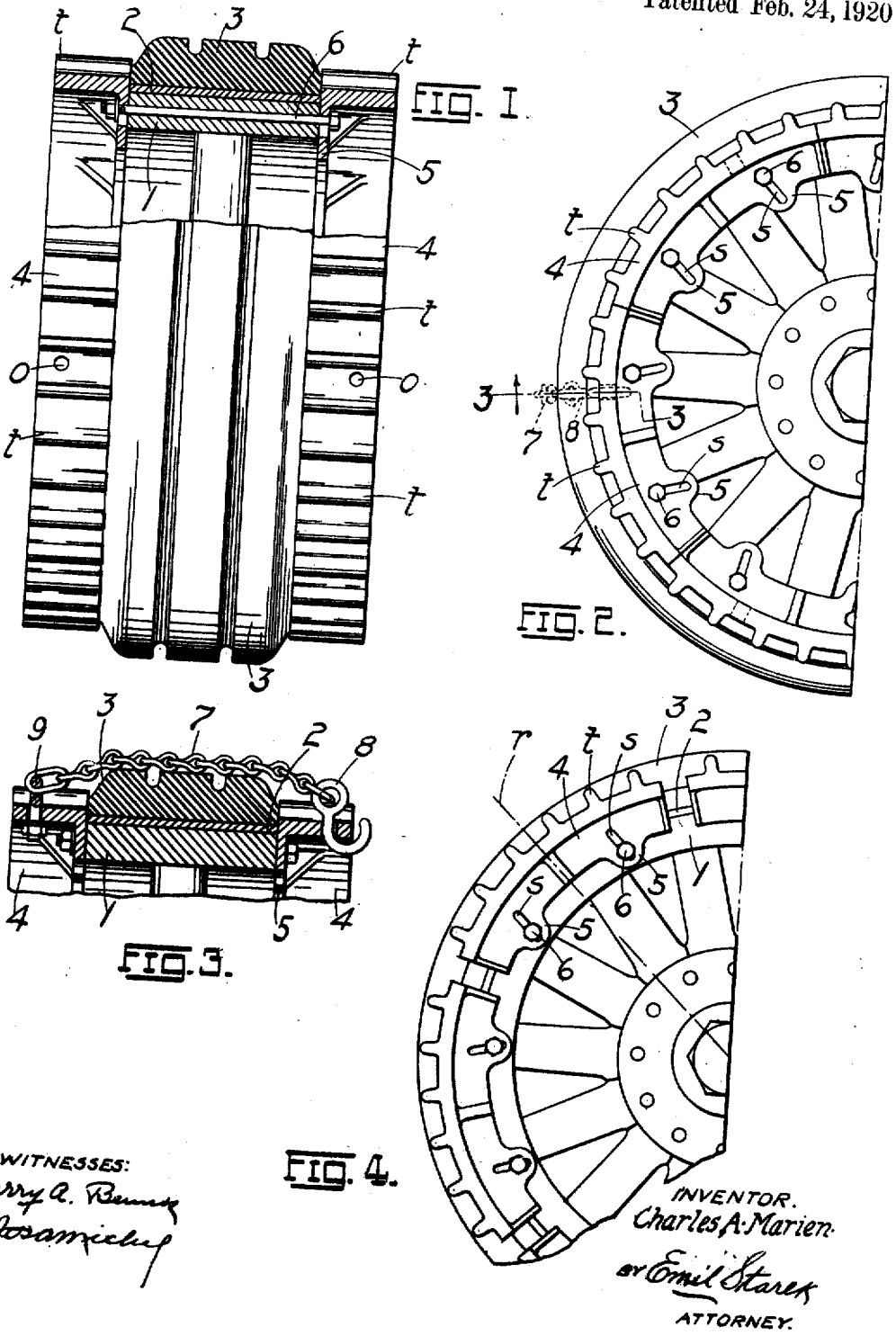

CHARLES A. MARIEN, OF ST. LOUIS, MISSOURI.

VEHICLE-WHEEL.

1,331,575.  Specification of Letters Patent.  Patented Feb. 24, 1920.

Application filed September 13, 1918. Serial No. 253,902.

*To all whom it may concern:*

Be it known that I, CHARLES A. MARIEN, a citizen of the United States, residing at St. Louis, State of Missouri, have invented certain new and useful Improvements in Vehicle-Wheels, of which the following is a full, clear, and exact description, reference being had to the accompanying drawings, forming a part hereof.

The present invention is directed to improvements in vehicle-wheels, having for its object to provide the ordinary wheel with extension treads disposed on either side of the main tire (whether solid or pneumatic) for the purpose of affording additional or a more extended support for the wheel especially in cases where the load carried by the vehicle is sufficient to cause the main tire of the wheel to sink into soft or marshy country roads over which the vehicle may be run after leaving the usual hard and paved streets of the city. This extension or emergency tread also comes into play on city streets when used to supplement the ordinary pneumatic tire which may collapse while in service, the extended tread thereby dispensing temporarily at least with the necessity of removing the collapsed tire and inflating and placing on a new tire, the emergency tread being sufficient to permit the vehicle to continue on its journey without further attention until the machine is returned to its garage when a new pneumatic tire may be fitted to the wheel. In the present embodiment of my invention the extension tread may be made in sections which are radially adjustable so that the peripheries of the sections may be moved into coincidence with the periphery of the tread of the main tire thereby permitting the wheel to be supported simultaneously by the main tire and the extension tread, an arrangement which is taken advantage of in the event of abnormal loads being imposed on the vehicle. The advantages of the invention will be fully apparent from the following detailed description in connection with the accompanying drawings in which—

Figure 1 represents an edge view, partly in section, of a truck wheel showing one form of the invention applied thereto; Fig. 2 is a side elevation of one-half of the wheel showing the extension tread sections in their contracted position; Fig. 3 is an enlarged cross-section on the line 3—3 of Fig. 2 with the antiskid chain attached; and Fig. 4 is a view similar to Fig. 2 showing the tread sections in their expanded position.

Referring to the drawings, 1, represents the felly, 2, the felly-band, and 3, a conventional form of solid tire as used on truck wheels. Bolted to each side of the felly are a series of circular angle-segments 4 provided on either side of a central radial line *r* (Fig. 4) with slots *s* elongated in a direction parallel to said line, the radially disposed leg of the segment in which the slots are formed being provided with extension lobes or ears 5 to accommodate the slots. The slots of a segment on one side of the wheel are in transverse alinement with the slots on the opposite side, a single bolt 6 through each pair of slots serving to secure the segments to the felly. In Fig. 2 of the drawings the segments 4 occupy their inner or contracted position bringing the tread ribs or spurs *t* disposed on the periphery of the leg of the segment forming the extension tread, inside the tread or periphery of the tire 3 and thus clearing the ground over which the wheel passes if it be hard enough to sustain the load without causing the wheels to sink into it. In cities where the roads are usually paved or rolled hard to sustain heavy loads, the extension treads would not be called into requisition when in their contracted position (Fig. 1); but should the vehicle heavily loaded be driven from the city into the country, and the country roads be too soft to sustain the load without permitting the tire 3 to sink into the soft mud, the moment the tire had sunk to bring the tread spurs *t* in contact with the ground, the weight on the wheel would then be supported both by the tire 3 and the tread extensions composed of the segments 4, thus insuring a wide or extended support for the wheel and its load. As well understood in the art the purpose of the tread formations such as *t* is to insure a grip on the ground passed over, and, where passing over a hard or slippery surface, to prevent skidding. The spurs *t* for example may be made to serve in the latter capacity by moving the segments 4 radially outward and securing them in position when the spurs have been brought into coincidence with the tread periphery of the tire 3 as shown in Fig. 4, in which position the extension treads would likewise be available for operating on soft roads as clearly obvious from the drawing. The parts are usually set to the position shown in Fig. 4 where the truck or vehicle is run indiscriminately or alternately over hard and soft roads, or over icy roads (the spurs t preventing skidding), or where it is desired to relieve the load on the rubber tire 3. Where the tire 3 is alone used as the tread member as shown in Figs. 2 and 3, in order to prevent skidding I dispose across the tire a series of anti-skid chains 7 the same being fastened at one end to an eye-hook 8 the shank of which is passed through an opening o formed in the tread extension member on one side, the opposite end of the chain being secured to an eye-bolt 9 the shank of which is passed through an opening o in the tread extension member on the opposite side.

Having described my invention what I claim is:

1. In combination with a vehicle wheel, a series of annular segments disconnected from one another secured to the sides of the wheel and collectively forming supplemental treads for the wheel, each segment being provided on either side of a central radial line from the axis of the wheel with elongated slots parallel to said line, devices on the wheel traversing the slots of opposing segments to permit of radial adjustment of the segments, and means on said devices for securing the segments in their adjusted positions.

2. In combination with a vehicle wheel provided with a felly, a tire on the felly, a series of circular angle segments collectively forming an angle ring secured to the opposite sides of the felly, the leg of the segment engaging the felly being provided on either side of a central radial line from the axis of the wheel with elongated slots parallel to said line, a slot of one leg alining with a slot of the leg opposite thereto, a securing bolt passed through the felly and through the alining slots, the several segments being adjustable radially to and from the periphery of the wheel, the outwardly projecting legs of the several segments collectively forming a supplemental or emergency tread for the wheel.

In testimony whereof I affix my signature, in presence of two witnesses.

CHARLES A. MARIEN.

Witnesses:
EMIL STAREK,
JOS. A. MICHEL.